(12) United States Patent
St-Pierre (10) Patent No.: US 8,387,774 B2
(45) Date of Patent: Mar. 5, 2013

(54) APPARATUS FOR SPACING BOARDS

(75) Inventor: Michel St-Pierre, St-Prime (CA)

(73) Assignee: Novilco Inc., Saint-Felicien (CA)

( * ) Notice: Subject to any disclaimer, the term of this patent is extended or adjusted under 35 U.S.C. 154(b) by 361 days.

(21) Appl. No.: 12/169,804

(22) Filed: Jul. 9, 2008

(65) Prior Publication Data
US 2009/0014282 A1   Jan. 15, 2009

Related U.S. Application Data

(60) Provisional application No. 60/948,603, filed on Jul. 9, 2007.

(51) Int. Cl.
*B65G 47/00* (2006.01)
*G06F 7/00* (2006.01)

(52) U.S. Cl. ............... 198/476.1; 198/461.3; 198/459.5; 198/463.5; 700/219

(58) Field of Classification Search ........................ None
See application file for complete search history.

(56) References Cited

U.S. PATENT DOCUMENTS

| | | | |
|---|---|---|---|
| 1,855,441 A | | 4/1932 | Crouse |
| 2,419,351 A | | 4/1947 | Glassner |
| 2,974,828 A | | 3/1961 | Matteson |
| 3,206,066 A | | 9/1965 | McAlpine |
| 3,213,999 A | * | 10/1965 | Williams .................... 198/468.1 |
| 3,473,676 A | | 10/1969 | Cotney |
| 3,738,510 A | | 6/1973 | Mason |
| 3,799,316 A | * | 3/1974 | Davidge et al. ............ 400/697.1 |
| 3,799,318 A | * | 3/1974 | Dekoekkoek .............. 198/463.5 |
| 3,968,886 A | | 7/1976 | Leon |
| 4,394,896 A | * | 7/1983 | McComas et al. ....... 198/341.06 |
| 4,878,803 A | | 11/1989 | Whiddon |
| 5,526,753 A | * | 6/1996 | Morikiyo et al. ............. 104/162 |
| 5,662,203 A | * | 9/1997 | St-Pierre et al. ........... 198/463.5 |
| 5,692,292 A | * | 12/1997 | Asai et al. ........................ 29/740 |
| 5,863,176 A | | 1/1999 | Newnes et al. |
| 6,065,927 A | | 5/2000 | Baron et al. |
| 6,354,167 B1 | | 3/2002 | Snow |
| 6,354,430 B1 | * | 3/2002 | Oe ............................. 198/626.6 |
| 6,431,345 B2 | * | 8/2002 | Burgener et al. .......... 198/461.3 |
| 6,439,829 B1 | | 8/2002 | Johnson |
| 6,655,902 B2 | | 12/2003 | Dubé et al. |
| 6,722,844 B2 | | 4/2004 | Lunden |
| 6,755,605 B2 | | 6/2004 | Halper |

FOREIGN PATENT DOCUMENTS

CA   2456958 A1   9/2005

* cited by examiner

*Primary Examiner* — Kavel Singh
(74) *Attorney, Agent, or Firm* — Baker & Hostetler LLP (57) ABSTRACT

An apparatus for providing spaced boards is disclosed. The apparatus comprises a receiving section, a spacing section and a delivery section. The apparatus is characterized by the presence of overlapping providing means and conveying means, releasable stopping means and vertical pushing means which are operatively connected for releasing one board at a time. Repeated stopping and releasing of boards result in a continuous and regular flow of evenly spaced boards.

28 Claims, 7 Drawing Sheets

APPARATUS FOR SPACING BOARDS

RELATED APPLICATIONS

The present application claims priority to U.S. provisional application No. 60/948,603 filed on Jul. 9, 2007, the content of which is incorporated herein by reference.

FIELD OF THE INVENTION

The invention relates to processing of wood in mills. More precisely, this invention pertains to a method and automatic apparatus for spacing boards.

BACKGROUND OF THE INVENTION

It is common in sawmills to process a large number of individual boards of selected sizes for further sorting, turning, cutting or planning. Most of the times, the boards emerge from the mill in random order and must be presented separately and individually for proper processing (e.g. end trimmer or bin sorter). Therefore, there are different types of automatic devices that exist for loading, transferring and stacking boards. Examples of such devices are described in U.S. Pat. No. 4,869,360; U.S. Pat. No. 5,921,376; U.S. Pat. No. 5,353,272; U.S. Pat. No. 6,048,164; U.S. Pat. No. 6,238,174; U.S. Pat. No. 6,431,343; and U.S. Pat. No. 6,446,485.

Although useful, the devices known in the art do not address all the needs of the wood cutting industry. For improving their productivity, sawmills require faster devices that are versatile enough to operate at variable speeds, capable of varying the distance between the spaced apart boards, and also capable of spacing boards of different thickness and length. Furthermore, safety of some of those devices is a problematic as they can pitch boards in the air thereby posing serious risks to surrounding workers and equipment.

Therefore, it would be desirable to be provided with an apparatus for spacing boards that is automatic, that can operate at high speed, and that can be feed with boards of different thickness and length.

Features of the invention will be apparent from review of the disclosure, drawings and description of the invention below.

BRIEF SUMMARY

According to one aspect, the invention relates to an apparatus for spacing out boards. According to one embodiment, the apparatus comprises:

a provider for providing a flow of boards, the provider having a providing end wherefrom the flow of boards is provided;

a conveyor for conveying spaced out boards, the conveyor having a receiving end overlapping the providing end;

a stopper, the stopper having a blocking position for retaining a board at the receiving end of the conveyor and preventing forward movement of said board on the conveyor, and a release position for freeing said retained board and allowing movement of the board on the conveyor;

a vertical pusher for applying a downwardly oriented force on a board retained at the receiving end of the conveyor, said force increasing friction of the board on the conveyor and urging movement of the board on said conveyor; and a controller for coordinating an actuation of the vertical pusher and movement of the stopper to its release position.

According to one embodiment, the provider comprises a powered conveyor for providing an uninterrupted flow of adjacent boards.

In one embodiment, the conveyor preferably comprises a belt conveyor. The belt can be made of a material selected from a group consisting of rubber compounds, plastic compounds, silicone, urethane, and gum rubber According to one embodiment, the receiving end of the conveyor is positioned above (e.g. about 1.5 mm to about 3.2 mm) the overlapping providing end of the provider.

In another embodiment, the apparatus comprises at least two stoppers and at least two vertical pushers. The at least two stoppers and at least two vertical pushers being positioned at opposite sides of the conveyor in order to contact distanced portions a board.

In yet a further embodiment, the stopper comprises a pivotable finger positioned at the receiving end of the conveyor. The pivotable finger alternatively pivots between a blocking position for contacting a front face of a board and a release position. The pivotable finger may be mounted on an axle positioned underneath a plane defined by a top surface of the receiving end overlapping the providing end. The pivotable finger may be actuated using air pressure, and it can pivots at a speed typically ranging between 0 and 400 times per minute or more.

In one embodiment, the vertical pusher applies a temporal downwardly oriented force on a board retained at the receiving end of the conveyor. The pusher may comprise a pivotable arm positioned above a plane defined by a top surface of the receiving end overlapping the providing end. Such arm may comprise at least one board contacting wheel mounted at an end thereof. The pivotable arm may be actuated using air pressure and it can pivots at a speed typically ranging between 0 and 400 times per minute or more.

In a further embodiment, the apparatus further comprises an antifriction member pivoting on an axle located underneath a plane defined by a top surface of the receiving end overlapping the providing end. The antifriction member pivots between a non-operating position and an operating position wherein it applies an upward pressure on a board retained at the receiving end of the conveyor thereby decreasing friction of the retained board on the conveyor.

In a one embodiment, the controller is operatively connected to the stopper and the vertical pusher such that actuation of the stopper from its blocking position to its release position shortly precedes actuation of the vertical pusher. The controller preferably comprises a detector for detecting presence or absence of a retained board at the receiving end of the conveyor. The detector may comprise an optical detector operatively connected to the stoppper.

According to another aspect, the invention relates to an apparatus for spacing out boards. According to one embodiment, the apparatus comprises a chain conveyor for providing a flow of boards to be spaced out, said chain conveyor having a providing end wherefrom the flow of boards is provided;

a belt conveyor for conveying spaced out boards, said a belt conveyor having a receiving end overlapping the providing end of the chain conveyor;

at least two pivotable fingers positioned at substantially opposed extremities of the receiving end of the belt conveyor, said pivotable fingers alternatively pivoting between a blocking position for contacting a front face of a board and a release position;

at least two pivotable arms positioned above and at substantially opposed extremities of the receiving end of the belt conveyor, said pivotable arms being configured for applying a downwardly oriented force on a board retained at the receiving end of the belt conveyor, said force increasing friction of the board on the belt conveyor and urging movement of the board on said belt conveyor;

at least one optical detector for detecting presence or absence of a retained board at the receiving end of the belt conveyor; and a signal processing unit operatively connected to said pivotable fingers, to said pivotable arms and to said optical detector, the signal processing unit coordinating actuation of the pivotable arms and coordinating movement of the pivotable fingers between said blocking and release positions.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF PREFERRED EMBODIMENTS

In the following description of the embodiments, references to the accompanying drawings are by way of illustration of an example by which the invention may be practiced. It will be understood that other embodiments may be made without departing from the scope of the invention disclosed.

Figure 1:
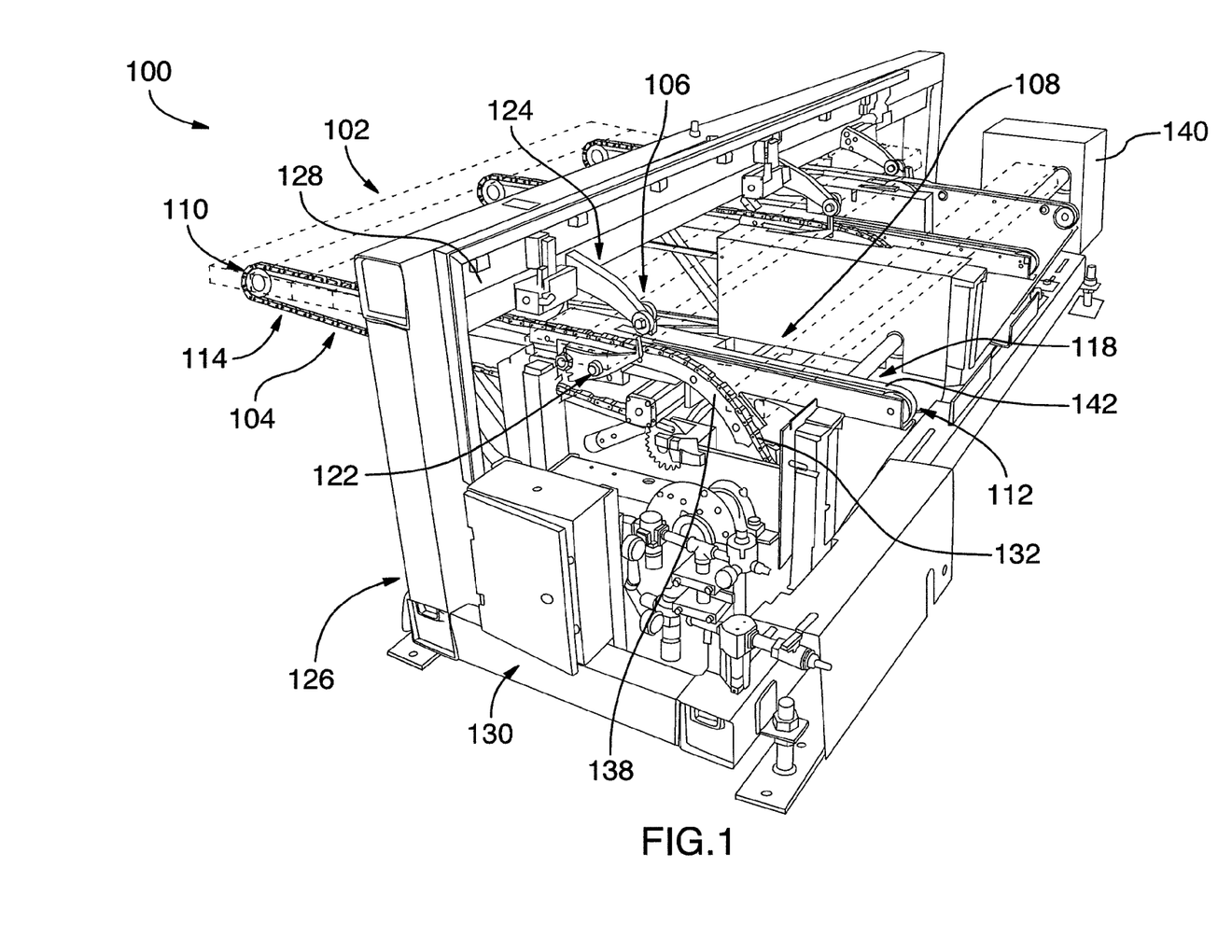
FIG. 1 is a top perspective view of an embodiment of an apparatus for spacing boards.
Figure 1A:
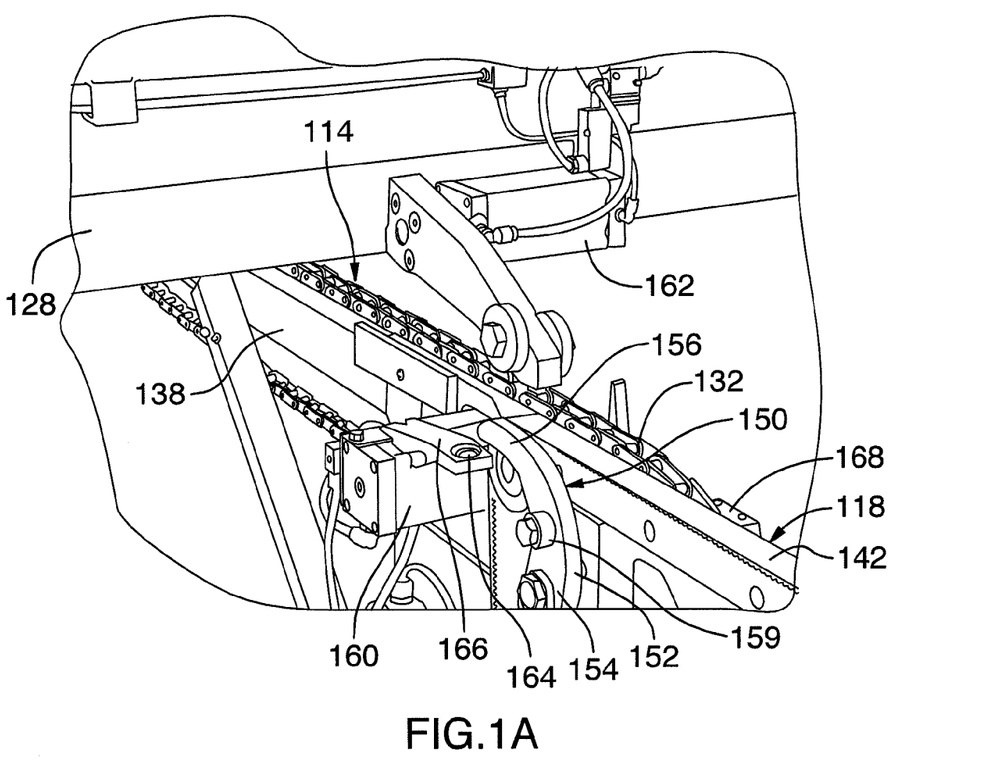
FIG. 1A is a top left perspective view of an enlarged section the embodiment of the apparatus for spacing boards shown in FIG. 1.
Figure 1B:
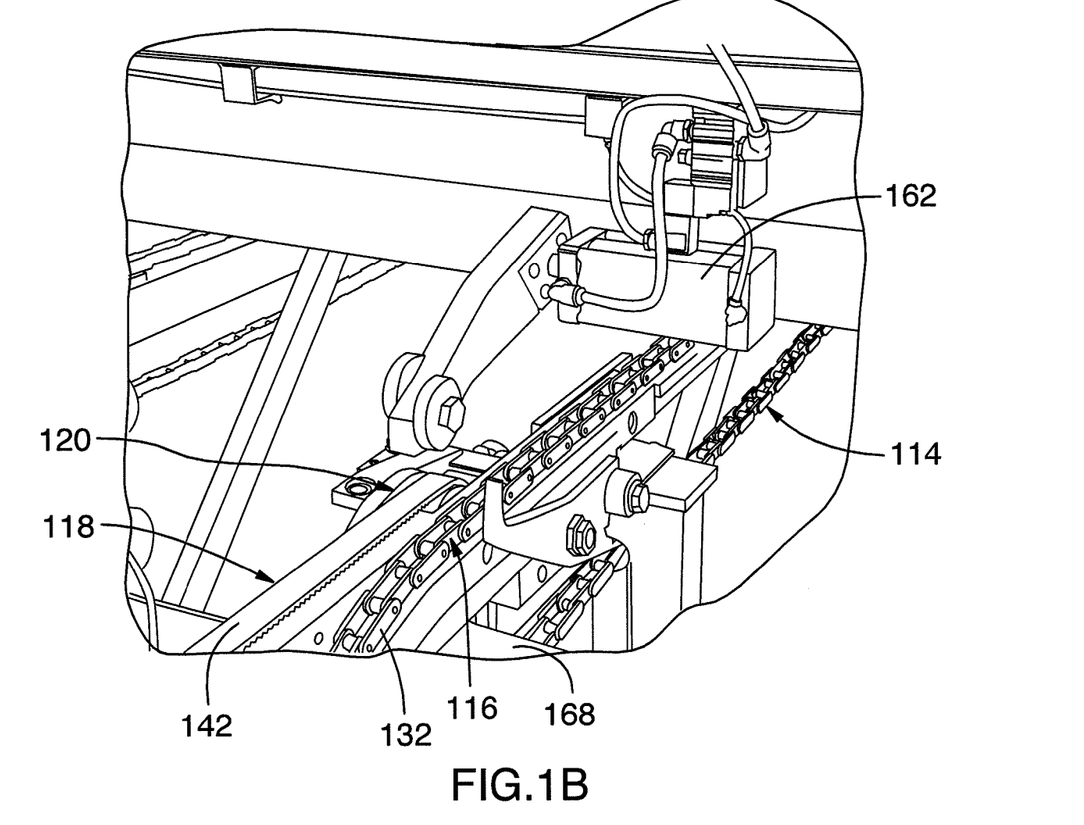
FIG. 1B is a top right perspective view of an enlarged section of the embodiment of the apparatus for spacing boards shown in FIG. 1.

Now referring to FIGS. 1, 1A and 1B, there is shown an embodiment of an apparatus 100 for spacing boards 102. The apparatus 100 comprises a receiving section 104, a spacing section 106 and a delivery section 108. Therefore, the apparatus of the invention devised for receiving and providing a continuous flow of boards 102 at a first end 110 thereof, displaces the boards 102 towards a second, opposite end 112 thereof while spacing out said flow of boards 102 and delivers spaced out boards at said second end 112. In operation, the boards are received at the receiving section 104 to be moved to the spacing section 106 where they stop for a short period of time in order to be separated before moving to the delivery section 108 of the apparatus.

Accordingly, the apparatus 100 comprises provider 114 for providing a flow of boards 102, the provider having a providing end 116 wherefrom the flow of boards 102 is provided, as best shown on FIG. 1B.

The apparatus 100 further comprises conveyor 118 for conveying spaced out boards; the conveyor 118 having a receiving end 120 overlapping the providing end 116, as best shown on FIG. 1B. The conveyor displaces boards from the receiving end 120 to the delivery section 108.

The apparatus 100 further comprises a stopper 122. The stopper 122 has a blocking position (see FIG. 2) for retaining a boards at the receiving end 120 of the conveyor 118 and preventing forward movement of said boards thereon, and a release position (see FIG. 3) for freeing said retained boards and allowing movement of the boards on the conveyor 118.

The apparatus 100 further comprises a vertical pusher 124 for applying a downward temporal pressure on a board retained at the receiving end 120 of the conveyor 118, the pressure increasing friction of the board on the conveyor 118 and urging movement of the boards on the conveyor 118.

The apparatus 100 further comprises a controller for coordinating an actuation of the vertical pusher 124 and movement of the stopper 122 to its release position.

The elements of the apparatus 100 will now be detailed according to one embodiment of the present invention.

In the embodiment shown on FIG. 1, the apparatus 100 comprises a frame 126. The frame 126 has an upper structure 128 and a base structure 130 to which the provider 114, conveyor 118, stopper 122 and vertical pusher 124 are operatively connected. The frame 126 is designed to support the weight of the apparatus 100 and of a plurality of boards 102 and it is therefore preferably made of a strong metal such iron or the like.

Figure 2:
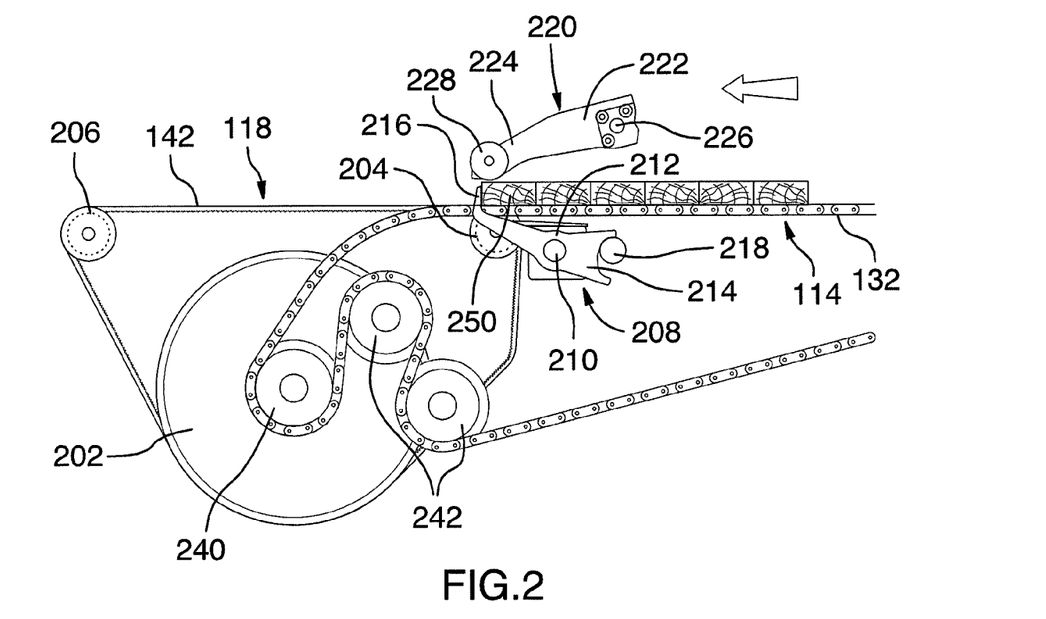
FIGS. 2, 3, 4 and 5 are side views of selected elements of an embodiment of the apparatus according to the invention, the figures showing the apparatus at different stages in the process of spacing boards.

In the embodiment shown in FIG. 1, the provider 114 comprises a powered conveyor; the conveyor comprising a chain 132 for receiving and moving the boards 102 to the spacing section 106 of the apparatus 100. As shown in FIG. 2, the chain 132 is operatively connected and loops around a set of driving gear 240 and idle wheels 242. In this embodiment, the idle wheels 136 are mounted on an axle located at the first end 104 of the apparatus 100. The driving gear 240 is mounted on an axle operatively coupled to driver. In preferred embodiments, the speed of the conveyor can be controlled such that the chain 132 moves from about 0 m/s to about 0.22 m/s, or about 0 m/s to about 0.7 m/s.

The provider 114 further comprise an optional chain guiding rail 138 whereon the chain 132 sits. The purpose of the chain guiding rail 138 is to guide the chain 132 along a predetermined path extending from the first end 110 of the apparatus 100 toward the delivery section 108. The guiding rail 138 is welded to the frame 126.

In the embodiment shown on FIG. 1, the driver comprises an electric motor 140, but other type of engines (e.g. hydraulic, pneumatic, driving shaft, etc.) could also be used. Similarly, the invention is not limited to a conveyor using a chain and since other types of conveyor, such as a belt could also be used. Therefore, in another embodiment, the provider 114 may comprises a belt conveyor. In yet another embodiment, the provider 114 may comprises a sloped surface. The skilled addressee will appreciate that the provider 114 may be any means capable of inducing and maintaining forward movement of a plurality of boards toward the spacing section 106 of the apparatus.

The apparatus 100 of the invention further comprises a conveyor 118 for conveying spaced out boards 102. In the embodiment illustrated in FIG. 2, the conveyor 118 comprise a belt conveyor having a belt 142 looping around a driving wheel 202, a first idle pulley 204 and a second idle pulley 206. The belt 142 rotates about the driving wheel 144 and the pulleys 204, 206 such that the boards 102 move from the spacing section 106 towards the delivery section 108. In preferred embodiments, the speed of the belt 142 can be controlled such that it moves from about 0 m/s to about 0.66 m/s, or about 0 m/s to about 2.1 m/s. In one embodiment the speed of the belt 142 and of the conveyor is adjusted such that the speed at which the boards move away from the spacing section 106 is greater than the speed at which they enters that section.

Preferably, the belt 142 is made of rubber. It can also be made of another a material such as plastic, silicone, urethane, gum rubber of any other material that one skilled in the art might see fit for this application.

Alternatively, the coveyor 118 may simply comprise a wheel having a friction surface such as rubber or the like and an inclined slope on which boards could slide away from the spacing section. In a further alternative embodiment, the conveyor 118 the wheel may consist of a sprocket wheel. The skilled addressee will appreciate that various other embodiments may be used for conveyor 118.

The stopper 122 is located at the spacing section 106 of the apparatus 100. In the embodiment illustrated in FIGS. 1 to 6, the stopper 122 comprise a pivotable finger 208 positioned at the receiving end 120 of the conveyor 118, the finger 208 being mounted on an axle 210 positioned below the providing end 116.

As best show in FIGS. 2 to 5, when in blocking position the finger 208 holds the flow of boards 102, effectively stopping boards 102 from moving forward onto the belt 142. When the finger is moved to its release position, the boards resume moving for a given duration while the finger 208 remains in its release position. The finger 208 is then positioned back in its blocking position as soon as practicable and holds this position for a given amount of time. The switching from the blocking position and the release position enables releasing of evenly spaced individual boards. Preferably, a single board 102 is dispensed at a time but it is conceivable to control the apparatus to dispense unevenly spaced boards or to dispense more than one (e.g. 2, 3, 4, 5 or more) before the finger returns to its blocking position. It will be appreciated that the switching from the release position back to the blocking position is performed when no board is positioned above the finger 208. In one embodiment, the pivotable finger may pivots at a speed ranging between 0 and 400 times per minute, or at a speed ranging between 0 and 300 times per minute. Typically, fastest speeds can be achieved when all the boards to be processed are of the same sized.

In the illustrated embodiment, the pivotable finger 208 is a generally L-shaped member comprising a central bulging section 212, a generally crescent-shaped end 214 for limiting the range of movement of the pivotable finger 208 and an upwardly extending hooking tip 216. The bulging section 212 is operatively connected to a rotating axle 210. In the present embodiment, the rotating axle 210 is operatively connected to an actuator comprising a rotary pneumatic actuator 160 (FIG. 1A).

The pivotable finger 208 is further provided with a stop member 218 located within the crescent-shaped end 214, thereby limiting the rotational displacement of the pivotable finger 208. In the embodiment illustrated at FIGS. 2 to 5, at a blocking position, the hooking tip 216 of the finger 208 contacts a front face of the flow of boards 102, effectively retaining a board 102 at the overlap of the providing end 116 and the receiving end 120, whereas at a release position the hooking tip 216 of the finger 208 do not contact any board.

The skilled addressee will appreciate that the stopper 122 may be any means capable of effectively retaining and releasing boards and that the invention is not limited to a pivotable finger. For instance, in another embodiment, the stopper 122 comprise a tip moving vertically between a lower release position to an upper blocking position. Therefore, invention encompasses theses and additional stopper.

The vertical pusher 124 is also located at the spacing section 106 of the apparatus 100. In the embodiment illustrated in FIGS. 1 to 6, the vertical pusher 124 comprises a pivotable arm 220 connected to the upper structure 128 of the frame 126 and are positioned above a plane 600 formed by a top surface of the providing end 116, i.e. above the boards 102 (see FIG. 6). More specifically, the pivotable arm 220 comprises a mounting portion 222 and an angled-down portion 224.

The mounting portion 222 serves to pivot the arm 220 about an axle 226 and it is connected thereto by a fixer e.g. mounting brackets. The arm 220 is operatively connected to an actuator. In the illustrated embodiment, the actuator comprises a double acting rotary pneumatic actuator 162 (see FIGS. 1A and 1B) providing a rate actuation between 0 and 400 times per minute. Typically, speed will range between 50 and 400 actuation per minute, or between 200 and 300 times per minute. Typically, fastest speeds can be achieved when all the boards to be processed are of the same sized.

The angled-down portion 224 of the pivotable arm 220 comprises two optional board contacting wheels 228, 230 mounted at the end thereof. The contacting wheels are useful for easing movement of the pivotable arm 220 as it moves upwardly and downwardly with the passing boards. The board contacting wheels 228, 230 are particularly useful for thicker boards having a thickness of 5 cm (2") and above (e.g. 3".times.3" and 4".times.4" boards).

The skilled addressee will appreciate that the vertical pusher 124 may be any means capable of effectively applying a downward temporal pressure on a board 102 retained at the receiving end 120 of the conveyor 118. For instance, in another embodiment, the vertical pusher 124 comprise a rotating friction wheel for pressing of a board retained at the receiving end 120 of the conveyor 118 and for urging movement or increasing moving speed of such board. In other embodiment, the vertical pusher may comprise a pneumatic or hydraulic cylinder. Therefore, invention encompasses these and additional vertical pusher(s).

As indicated herein before, the apparatus 100 further comprises a controller for coordinating an actuation of the vertical pusher 124 and movement of the stopper 122 to its release position. In the present embodiment, the controller comprises a detector for detecting the presence or absence of a board retained at the receiving end 120 of the conveyor 118. In the present embodiment, the detector comprises an optical detector 164 (see FIG. 1A) located above a bracket 166 mounted on top of the actuator 160; the optical detector 164 pointing upwardly toward passing boards. In the embodiment illustrated herein, the apparatus 100 comprises three optical detectors 164 located near the stopper 122. A plurality of detectors helps avoiding misread of a single detector since errors can occurs when board are curved.

Although preferred to achieve high speed, the detector is somewhat facultative since manual activation of the stopper and vertical pusher is conceivable. It is also conceivable to preprogram actuation of the pivotable finger 208 and pivotable arm 220 according to an automatic switching scheme programmed depending on various parameters such as the size of the board, the speed of the chain 132, the speed of the belt 142, etc.

The controller may comprise a signal processing unit such as a microcontroller operatively connected to one or more optical detectors 164, the vertical pusher 124, and the stopper 122. The signal processing unit may be part of a computer assembly and may also be operatively connected to the conveyor and the belt for adjusting the speed thereof. This setup would provide ease of use to the apparatus and would allow for the sequence of operations to be completely preprogrammed and fully automated.

Figure 6:
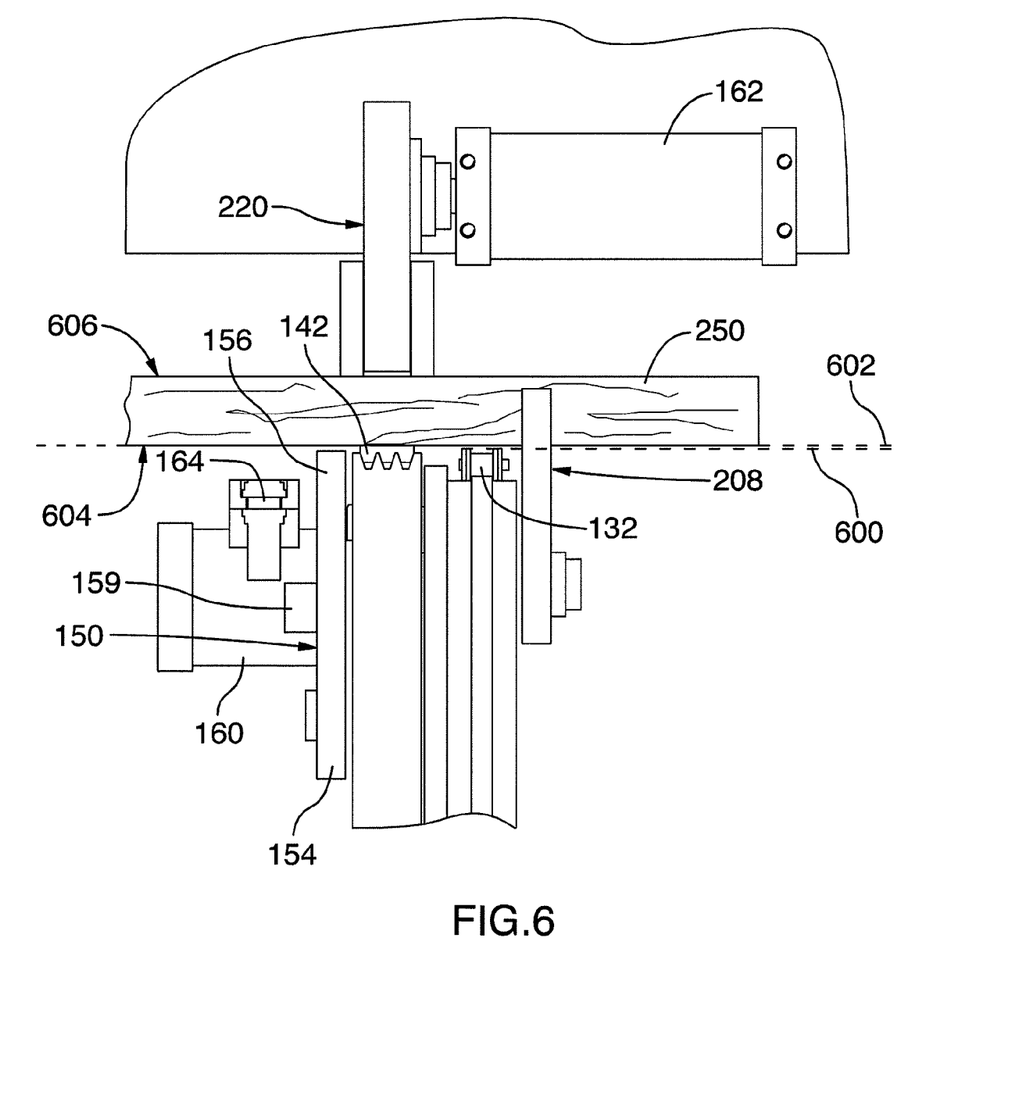
FIG. 6 is front sectional view of an enlarged section of the embodiment of the apparatus for spacing boards shown in FIG. 1.

Additional explanations regarding the basic principles of the functioning of the invention is given hereinafter with particular reference to FIG. 6. During normal operation, a bottom surface 604 of a board 102 travels onto the chain 132 and it is in constant contact therewith. This contact creates a friction force sufficient to move the board 102 forwardly. The forward movement of the board 102 on the chain 102 further provides forward momentum to the board 102.

In the illustrated embodiment, the providing end of the provider (i.e. the chain 132) is located on a first horizontal plane 600 while the receiving end of the conveyor (i.e. the belt 142) is located on a second, higher horizontal plane 602. Since the belt 142 of conveyor and the chain 132 of the provider overlaps, a retained board is positioned partly over the chain 132 and partly over the belt 142, that retained board is urged to move forwardly and upwardly fully onto the belt 142 by its momentum as well as by a force exerted by following boards Consequently, the bottom surface 604 of the retained board leaves the first horizontal plane 600 to fully contact the belt 142 located at the second horizontal plane 602. Best results have been observed when the overlap of the belt 142 and the chain 132 is about 30 to 45 millimeters. The apparatus could be configured to change or adjust this overlap if so desired.

The vertical pusher 124 provides a downward temporal pressure on the retained board. This downward pressure allows the retained board to exert sufficient downward force on the belt 142 prevent slipping of the board once released to urge movement of the released board onto the belt 142. When a board is retained at the providing end by the stopper 122, the actuator 162 of the pivoting arm 220 are an idle mode and the pivoting arm 220 is solely subjected to its own weight. The contacting wheels 228, 230 contact moving boards advancing toward the stopper 122 such that the pivotable arm 220 moves upwardly and downwardly according to the thickness of boards moving underneath.

In another embodiment, the apparatus 100 further comprises optional antifriction member 150. In the illustrated embodiment, the antifriction member 150 comprises a pivotable banana-shaped member 152 mounted below the plane 600 formed by a top surface of the providing end 116. The member 152 comprises a mounting end 154 and a contacting end 156.

The mounting end 154 serves to pivot the pivotable member 152 about an axle between a non-operating position and an operating position. A stop member 159 limits the movement of the pivotable member 152. The non-operating position is defined as a position wherein the contacting end 156 of the antifriction member 150 does not contact a board 250 retained at the receiving end 120 of the conveyor 118, while the operating position is defined as a position wherein the contacting end 156 of the antifriction member 150 applies an upward pressure on a board 250 retained at the receiving end 120 of the conveyor 118 in order to lessen friction of the board 250 on the coveyor 118. The pivotable member 152 is operatively connected to an actuator. In the illustrated embodiment, the actuator comprises a rotary pneumatic actuator 168. The main purpose of the antifriction member 150 is to release the pressure applied on the belt 142 by a retained board 250 while the belt 142 is still running. This help preventing premature tearing of the belt. Such functionality is particularly useful when loading of boards 102 on the receiving section 104 is paused or stopped, or when boards moving on the chain 132 towards the spacing section 106 of the apparatus 100 are improperly spaced or aligned.

The embodiment illustrated at FIG. 1, the apparatus 100 is configured to process boards of up to 12 feet (about 3.7 m) and the spacing section 106 comprises three sets of stopper 122 and vertical pusher 124 distanced at about 4 feet (about 1.22 m). Of course, those skilled in the art will appreciate that the size of the frame 126 and both the number and the distance of stopper 122, vertical pusher 124 and/or detector may be varied for configuring the apparatus of the invention to various needs, e.g. to process shorter and longer boards (e.g. 2, 4, 6, 8, 10, 12, 16, 20, 24 feet or more). Typically, the vertical pushing is being distanced from the conveyor in order to contact distanced portions (e.g. extremities, extremities and central portion) of a board.

Having described the components of the apparatus 100 according to different embodiments the invention, the operating sequence of a preferred embodiment will now be described in details with reference to FIGS. 2, 3, 4 and 6.

At the beginning of the process the pivotable finger 208 is in the blocking position. The chain 132 of the provider 114 is moving a continuous flow of boards 102 towards the spacing section 106 at a first speed. The belt 142 of the conveyor 118 has a displacement speed greater than that the chain 132.

As shown in FIG. 2, boards accumulates on the chain 132 since a retained board 250 is abutting the contacting tip 216 of the pivotable finger 208 and is thereby retained at the providing end 116 of the provider 114. Since the belt 142 of conveyor 118 and the chain 132 of the provider 114 overlap, that retained board 250 is positioned partly over the chain 132 and partly over the belt 142. Although not apparent on the figures, in the illustrated embodiment the retained board 250 is slightly inclined since the chain 132 (see the first horizontal plane 600) is slightly lower than the belt 142 (see the second horizontal plane 602). Best results have been observed when the belt 142 is being positioned about 1.5 mm to about 3.2 mm (i.e. about 1/16" to about 1/8") higher than the chain 132 (see FIG. 6).

Figure 3:
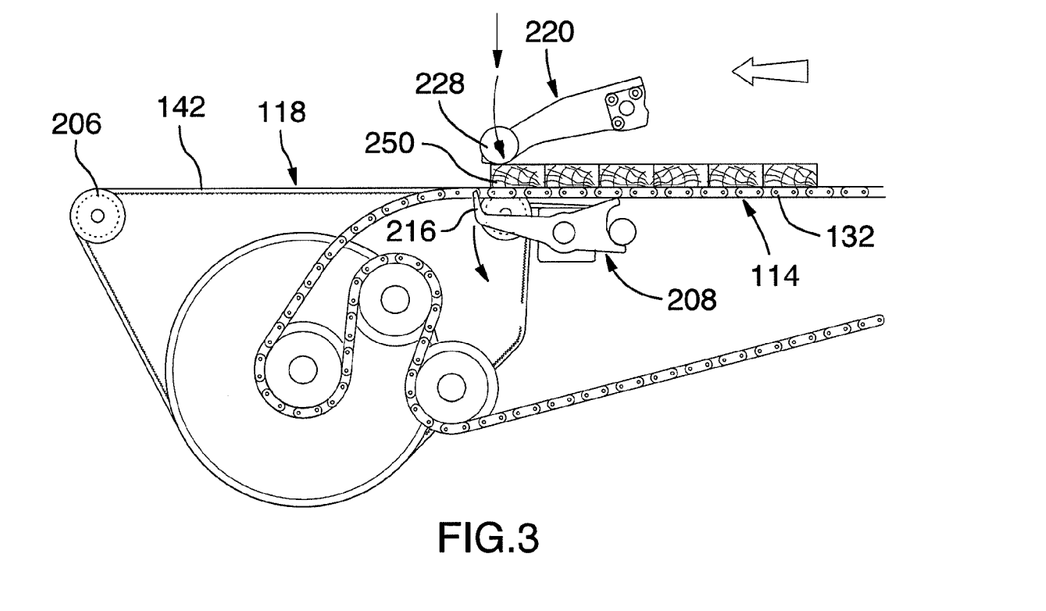

The optical detector 164 detects the presence of the retained board 250 abutting the pivotable finger 208. The actuator 160 of the pivotable finger 208 being operatively coupled to the controller, it pivots the pivotable finger 208 such that its hooking tip 216 moves downwardly in the release position and releases the retained board 250, as shown in FIG. 3.

Figure 4:
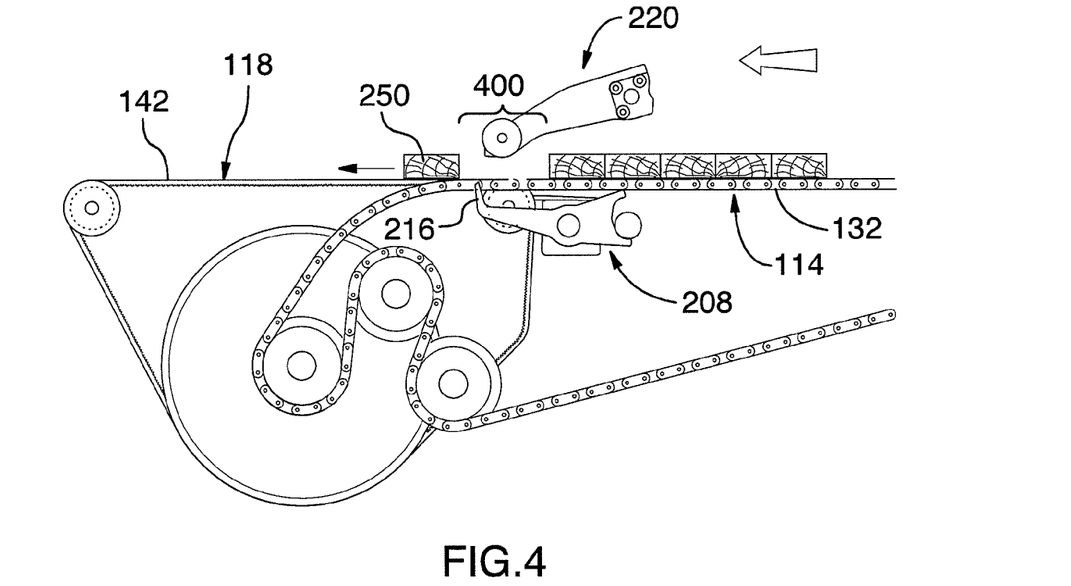

Shortly thereafter, the controller provide an impulsion of pressure to the actuator 162 operating the vertical pusher 124, resulting in a downward pressure being applied by the pivotable arm 220 for a very short period of time. Best results have been obtained when the pivotable arm applies a pressure ranging between 10 and 90 PSI for about 40 ms. The pressure being applied by the pivotable arm 220 on the upper surface 606 of the retained board 250 increase the friction of its lower surface 604 with the belt 142 underneath. This increase of friction urges the newly unblocked retained board 250 to engage the belt 142 further and move thereon towards the delivery section 108 of the apparatus 100 (FIG. 4). An empty space 400 is now created between the following boards on the chain 132 which are moving at speed lower than the speed of the belt 142.

Figure 5:
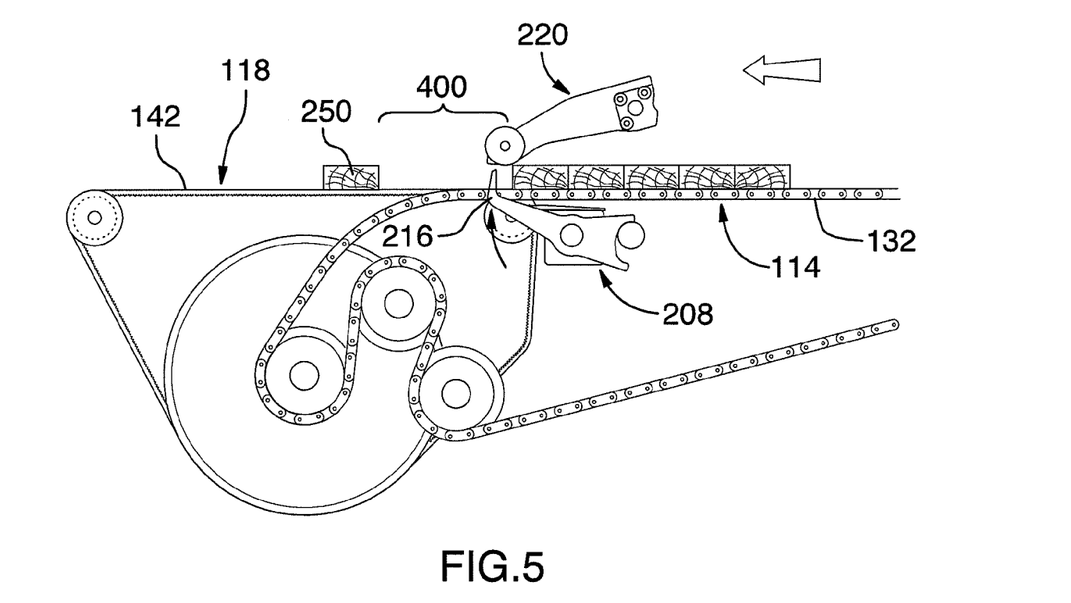

Upon detection of the empty space 400, the pivotable finger 208 is actuated back from its release position to its blocking position, as shown in FIG. 5. Of course, this actuation is performed when no board is located above the pivotable finger 208 to avoid risks of projecting boards 102 away from their intended path.

One can readily appreciate that the whole process and the repeated actuation of the pivotable finger 208 and pivotable arm 220 will result in a continuous and regular flow of evenly spaced boards.

Figure 7:
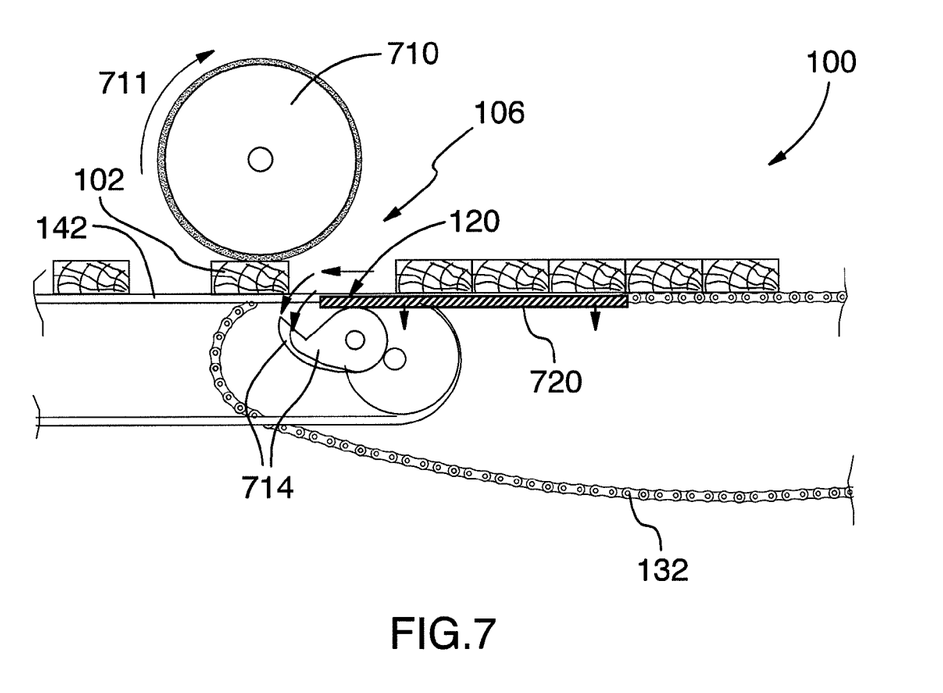
FIG. 7 is a side view of selected elements of another embodiment of the apparatus according to the invention.

Referring now to FIG. 7, there is shown another embodiment the apparatus 100 according to the invention. In this embodiment, the apparatus 100 comprises a friction wheel 710 located in the spacing section 106. Rotation of the friction wheel 710 is driven and its rotation 711 may be useful to increase the speed of a board 102 moving on the belt 142. The friction wheel 710 may also help ensuring that moving boards 102 stay properly aligned on the apparatus 100. The apparatus 100 shown in FIG. 7 also comprises a pair of hooks 714 pivoting between a blocking position for retaining a board at the receiving end 120 of the conveyor, and a release position for freeing a retained board. This embodiment also comprises an upwardly moving antifriction plate 720 for lifting boards 102 and reducing friction of boards 102 on the belt 142.

As seen therein, the apparatus of the invention thus possesses numerous advantages. It has a simple and yet, extremely effective design. It offers great performance and it is highly versatile since it can readily process board of different length (from 4 feet to 24 feet (1.22 m to 7.32 m), e.g. 4, 6, 8, 10, 12, 16, 20, 24 feet), different thickness (½ inch to 4 inches (1.27 cm to 5 cm), e.g. 1, 2, 3, 4 inches), and different width (1 inch to 12 inches (2.5 cm to 30 cm), e.g. 2, 4, 6, 8, 10, 12 inches). It is also ideal for high speed operation (e.g. 200, 250, 300, 400 pieces per minute, and possibly more), both at the green and the dry end of a mill. It can also be customized to specific needs (e.g. integrated to planermill system).

While the apparatus described herein is intended for spacing boards, the skilled addressee will appreciate that this apparatus could also be used for spacing different objects such as sticks. The apparatus of the invention can also very useful in the flooring industries since it does not puncture or leave marks on boards, a highly desired quality for preserving esthetic of hardwood flooring boards.

Although the above description relates to a specific preferred embodiment as presently contemplated by the inventor, it will be understood that the invention in its broad aspect includes mechanical and functional equivalents of the elements described herein.

The invention claimed is:

1. An apparatus for providing spaced out boards, said apparatus comprising:
    a provider configured to provide a flow of boards, said provider having a providing end wherefrom the flow of boards is provided;
    a conveyor configured to convey spaced out boards, said conveyor having a receiving end overlapping the providing end;
    a movable stopper having a blocking position for retaining a board at the receiving end of the conveyor and preventing forward movement of said board on the conveyor, and a release position for freeing said retained board and allowing movement of the board on the conveyor, the stopper extending below a plane of the receiving end of the conveyor when in the release position;
    a vertical pusher, including a pivotable arm positioned above a plane defined by a top surface of the receiving end overlapping the providing end, configured to apply a temporary downwardly oriented force from above on an upper surface of a board retained at the receiving end of the conveyor, said force temporarily increasing friction of the board on the conveyor and urging movement of the board on said conveyor, and said pivotable arm applying a pressure ranging between 10 and 90 PSI; and
    a controller configured to coordinate an actuation of the vertical pusher and movement of the stopper to its release position.

2. The apparatus of claim 1, wherein said provider comprises a powered conveyor for providing an uninterrupted flow of adjacent boards.

3. The apparatus of claim 1, wherein the conveyor comprises a belt conveyor.

4. The apparatus of claim 3, wherein said belt is made of a material selected from a group consisting of rubber compounds, plastic compounds, silicone, urethane, and gum rubber.

5. The apparatus of claim 1, wherein said apparatus comprises at least two stoppers and at least two vertical pushers, said at least two stopping means stoppers and at least two vertical pushers being positioned at opposite sides of the conveyor in order to contact distanced portions a board.

6. The apparatus of claim 1, wherein the stopper comprises a pivotable finger positioned at the receiving end of the conveyor, said pivotable finger alternatively pivoting between a blocking position for contacting a front face of a board and a release position.

7. The apparatus of claim 6, wherein said pivotable finger is mounted on an axle positioned underneath the plane defined by a top surface of the receiving end overlapping the providing end.

8. The apparatus of claim 6, wherein said pivotable finger is actuated using air pressure.

9. The apparatus of claim 1, wherein said pivotable arm comprises at least one board contacting wheel mounted at an end thereof.

10. The apparatus of claim 1, wherein said pivotable arm is actuated using air pressure.

11. The apparatus of claim 1, further comprising an antifriction member pivoting on an axle located underneath the plane defined by a top surface of the receiving end overlapping the providing end, said antifriction member pivoting between a non-operating position and an operating position wherein it applies an upward pressure on a board retained at the receiving end of the conveyor to thereby decrease friction of said board on the conveyor.

12. The apparatus of claim 1, wherein said controller are is operatively connected to said stopper and said vertical pusher, whereby during operation actuation of the stopper from its blocking position to its release position shortly precedes actuation of the vertical pusher.

13. The apparatus of claim 12, wherein the controller comprises a detector for detecting presence or absence of a retained board at the receiving end of the conveyor.

14. The apparatus of claim 13, wherein the detector comprises an optical detector operatively connected to the stopper and to the vertical pusher.

15. An apparatus for spacing out boards, said apparatus comprising:
    a chain conveyor configured to provide a flow of boards to be spaced out, said chain conveyor having a providing end wherefrom the flow of boards is provided;
    a belt conveyor configured to convey spaced out boards, said a belt conveyor having a receiving end overlapping the providing end of the chain conveyor;
    at least two pivotable fingers positioned at substantially opposed extremities of the receiving end of the belt conveyor, said pivotable fingers configured to alternatively pivot between a blocking position for contacting a front face of a board and a release position for freeing said retained board and allowing movement of the board on the conveyor, the pivotable fingers extending below a plane of the receiving end of the conveyor when in the release position;

at least two pivotable arms positioned above and at substantially opposed extremities of the receiving end of the belt conveyor, said pivotable arms being configured to apply a temporary downwardly oriented force from above on an upper surface of a board retained at the receiving end of the belt conveyor, said force temporarily increasing friction of the board on the belt conveyor and urging movement of the board on said belt conveyor;

at least one optical detector configured to detect presence or absence of a retained board at the receiving end of the belt conveyor; and a signal processing unit operatively connected to said pivotable fingers, to said pivotable arms and to said optical detector, the signal processing unit configured to coordinate actuation of the pivotable arms and coordinating movement of the pivotable fingers between said blocking and release positions.

16. An apparatus for providing spaced out boards, said apparatus comprising:

a provider configured to provide a flow of boards, said provider having a providing end wherefrom the flow of boards is provided;

a conveyor configured to convey spaced out boards, said conveyor having a receiving end overlapping the providing end;

a movable stopper having a blocking position for retaining a board at the receiving end of the conveyor and preventing forward movement of said board on the conveyor, and a release position for freeing said retained board and allowing movement of the board on the conveyor, the stopper extending below a plane of the receiving end of the conveyor when in the release position;

a vertical pusher configured to apply a temporary downwardly oriented force from above on an upper surface of a board retained at the receiving end of the conveyor, said force temporarily increasing friction of the board on the conveyor and urging movement of the board on said conveyor; and a controller configured to coordinate an actuation of the vertical pusher and movement of the stopper to its release position; and an antifriction member pivoting on an axle located underneath a plane defined by a top surface of the receiving end overlapping the providing end, said antifriction member pivoting between a non-operating position and an operating position wherein it applies an upward pressure on a board retained at the receiving end of the conveyor to thereby decrease friction of said board on the conveyor.

17. The apparatus of claim 16, wherein said provider comprises a powered conveyor for providing an uninterrupted flow of adjacent boards.

18. The apparatus of claim 16, wherein the conveyor comprises a belt conveyor.

19. The apparatus of claim 18, wherein said belt is made of a material selected from a group consisting of rubber compounds, plastic compounds, silicone, urethane, and gum rubber.

20. The apparatus of claim 16, wherein said apparatus comprises at least two stoppers and at least two vertical pushers, said at least two stoppers and at least two vertical pushers being positioned at opposite sides of the conveyor in order to contact distanced portions a board.

21. The apparatus of claim 16, wherein the stopper comprises a pivotable finger positioned at the receiving end of the conveyor, said pivotable finger alternatively pivoting between a blocking position for contacting a front face of a board and a release position.

22. The apparatus of claim 21, wherein said pivotable finger is mounted on an axle positioned underneath the plane defined by a top surface of the receiving end overlapping the providing end.

23. The apparatus of claim 21, wherein said pivotable finger is actuated using air pressure.

24. The apparatus of claim 16, wherein said pivotable arm comprises at least one board contacting wheel mounted at an end thereof.

25. The apparatus of claim 16, wherein said pivotable arm is actuated using air pressure.

26. The apparatus of claim 16, wherein said controller are is operatively connected to said stopper and said vertical pusher, whereby during operation actuation of the stopper from its blocking position to its release position shortly precedes actuation of the vertical pusher.

27. The apparatus of claim 26, wherein the controller comprises a detector for detecting presence or absence of a retained board at the receiving end of the conveyor.

28. The apparatus of claim 27, wherein the detector comprises an optical detector operatively connected to the stopper and to the vertical pusher.

* * * * *